United States Patent [19]

Boone

[11] 3,876,863

[45] Apr. 8, 1975

[54] INVENTORY TAKING UTILIZING TONE GENERATION

[76] Inventor: Jack M. Boone, 2801 La Ventana, San Clemente, Calif. 92672

[22] Filed: Feb. 12, 1973

[21] Appl. No.: 331,517

[52] U.S. Cl.... 235/61.7 R; 179/2 DP; 235/61.11 E; 235/159

[51] Int. Cl.... G06k 7/14; G06f 7/38; H04m 11/00; G06k 5/00

[58] Field of Search.... 179/100.1 R, 100.1 A, 2 DP; 235/61.11 E, 61.11 D, 61.11 A, 61.11 B, 61.7 B, 61.6 J, 61.9, 61.1 R, 159, 61.7 R; 340/147, 149 X, 146.3 SY; 178/2 E

[56] References Cited

UNITED STATES PATENTS

| | | | |
|---|---|---|---|
| 3,035,764 | 5/1962 | Beman | 235/61.9 R |
| 3,206,555 | 9/1965 | Huppert | 179/100.1 A |
| 3,381,787 | 5/1968 | Osborne | 179/100.1 R |
| 3,619,567 | 11/1971 | Scott | 235/61.1 R |
| 3,647,972 | 3/1972 | Glover | 179/2 DP |
| 3,652,795 | 3/1972 | Wolf | 179/2 DP |
| 3,665,164 | 5/1972 | Beveridge | 235/61.11 E |
| 3,688,087 | 8/1972 | Howard | 235/61.9 R |
| 3,735,350 | 5/1973 | Lemelson | 340/146.3 SY |
| 3,757,097 | 9/1973 | Kuijsten | 235/159 |

*Primary Examiner*—Daryl W. Cook
*Assistant Examiner*—Robert M. Kilgore
*Attorney, Agent, or Firm*—William W. Haefliger

[57] ABSTRACT

The accuracy and speed of inventory taking are enhanced through provision for calculation and recordation of sub-totals by means of equipment carried by the inventory taker, or alternate recordation of tones representative of numerical values, and also voice instructions, by means of equipment carried by the inventory taker, the tones being later decoded as signals used to operate an electronic calculator.

3 Claims, 11 Drawing Figures

INVENTORY TAKING UTILIZING TONE GENERATION

BACKGROUND OF THE INVENTION

This invention relates generally to inventory assessment procedures, and more particularly concerns method and system for taking and processing inventories in a rapid, efficient and accurate manner.

In the past, inventories and audits were accomplished primarily by manually written entries on appropriate forms of quantities or values of goods observed by the inventory taker, this procedure being excessively time consuming. Efforts have been made to increase the speed of such services as by recording voice transmitted numerical data onto magnetic tape for later playback and transcription onto suitable forms; however, this procedure is subject to unwanted error due to the uncertainty that the transcriber will accurately interpret or understand and transcribe all the voice enunciated numerical data on the tape being replayed.

SUMMARY OF THE INVENTION

It is a major object of the invention to provide solutions to the above as well as other problems and difficulties encountered in inventory taking.

In one of its forms, the invention comprises a platform sized for attachment to an inventory taker, a module including a keyboard operable to produce signals to operate an electronic calculator and means removably connecting the module to a table portion of the platform so that the inventory taker may operate the keyboard during his movement about the storage area for articles to be inventoried. As will appear, the module may be operatively connected to, but separate from, an electronic calculator also supported by the platform so that totals or amounts may be computed, the inventory taker then announcing the totals or amounts for recordation via a microphone connected with a tape recorder. As will appear, tone generator means to be described may be carried by the platform instead of the calculator.

In another of its forms, the invention contemplates a method of taking inventory wherein recorded values represent articles, or dollar values attributed to articles or groups of articles, and wherein a sequence of differently modulated code signals (as for example audible frequencies or tones) are generated to correspond to a sequence of such values, and the signal sequence is progressively recorded for subsequent readout and transcription as desired. As will appear, provision is made for intermittently recording on the same recording medium (as for example magnetic tape) of voice instructions or data concerning the articles, such instructions normally concerning non-numerical information such as the row or counter locations of the articles, whereby the accuracy of the numerical data is not subject to voice interpretation but the locations of the articles may be easily ascertained by the ultimate transcriber at a remote transcribing location.

Additional steps include reading the tape or recording medium and automatically operating a calculator, in response to such reading at the remote transcribe location, thereby to accumulate calculated value totals for transcription purposes; and intermittently operating a loudspeaker at that remote zone in response to readout of the voice instructions on the tape or recording medium, so that the transcriber may have accurate knowledge of auxiliary (non-numerical) information generated by the inventory taker as he moves about in the article storage area.

In its system aspects, said other form of the invention concerns the provision of generating means operable to generate a sequence of differently modulated code signals corresponding to a sequence of values representative of articles (or their monetary values); recording means responsive to the generating means to record on a medium such as magnetic tape that sequence of signals for subsequent readout; voice instruction input means connected with the recording means for intermittently recording on the medium of voice instructions concerning the articles (such as their locations); readout means for reading the recording medium and having a coded signal sequence output and a voice instruction output; a calculator operatively connected with the readout means (as via a decode means) to be responsive to the signal sequence output for accumulating calculated value totals for display and transcription purposes; and a loudspeaker operatively connected with the readout means to be responsive to the voice instruction output to reproduce the voice instructions in audible form.

These and other objects and advantages of the invention, as well as the details of illustrative embodiment, will be more fully understood from the following specification and drawings, in which:

DRAWING DESCRIPTION

Figure 8:
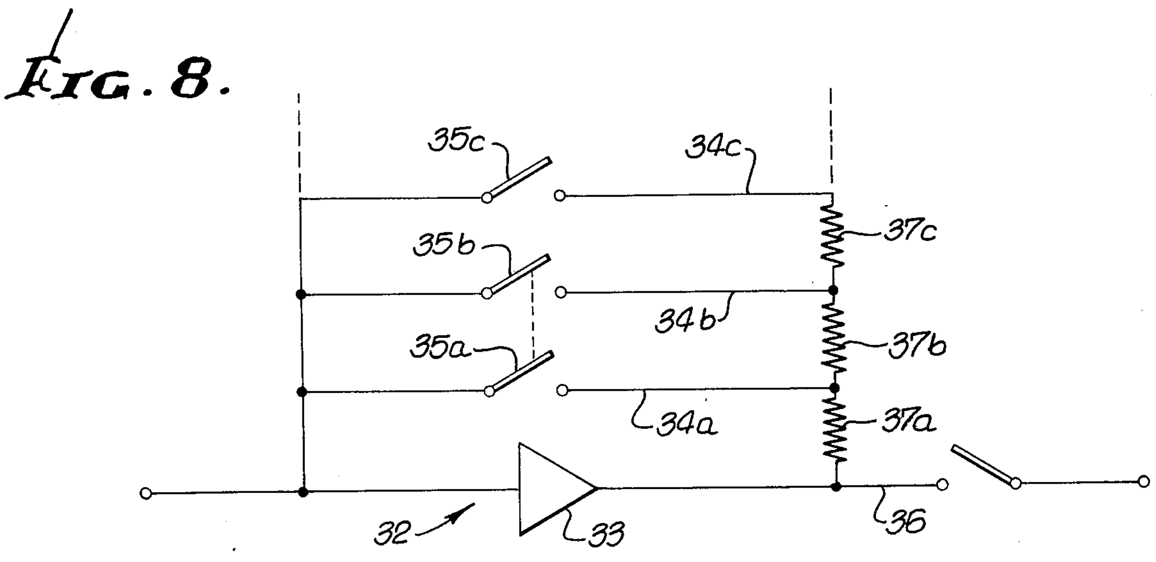
Figure 7:
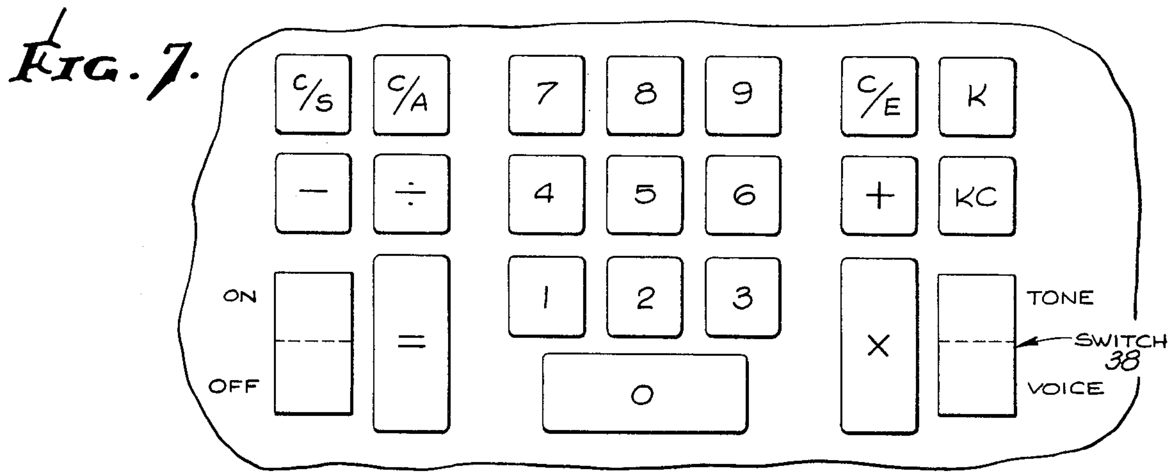

FIGS. **6*a* and 6*b*** are block diagrams illustrating another form of system employing the invention;

FIG. 7 is a keyboard module usable in the FIG. **6*a*** system;

FIG. 8 is a circuit diagram showing one type of tone generator usable in FIG. **6*a*** system.

Figure 6A:
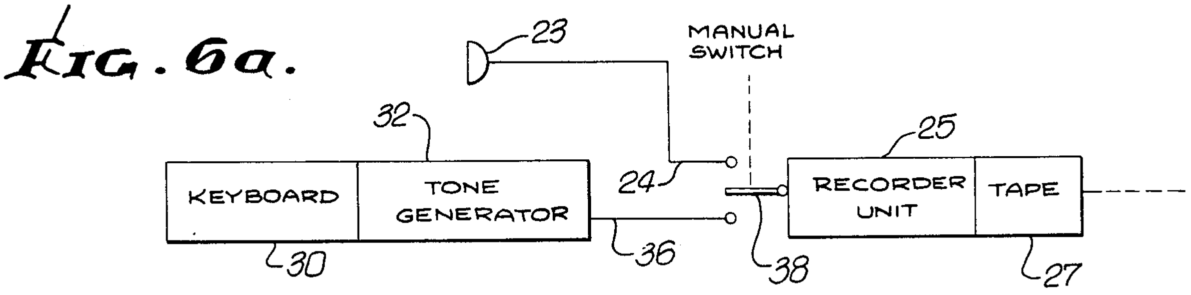
Figure 6B:
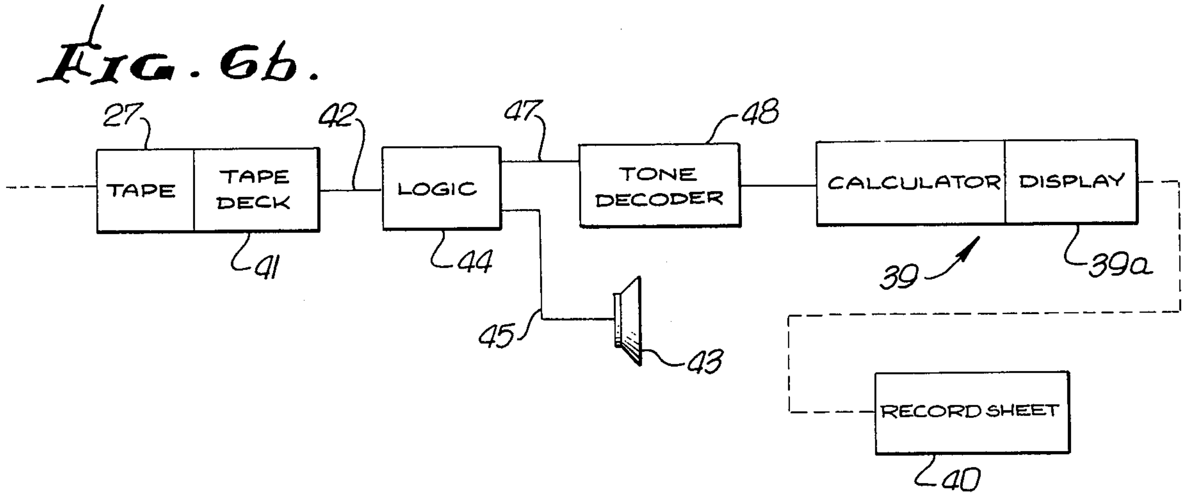
Figure 9:
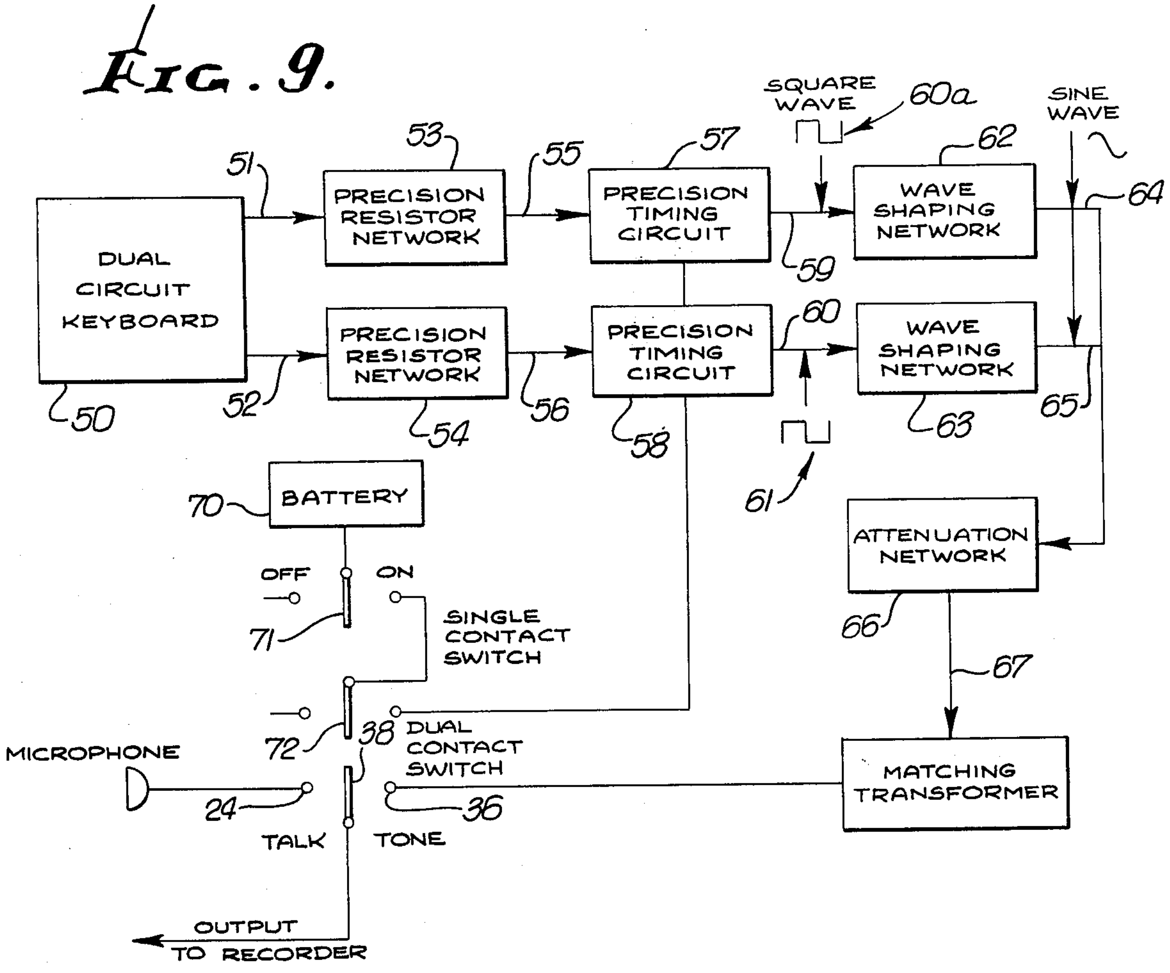
Figure 10:
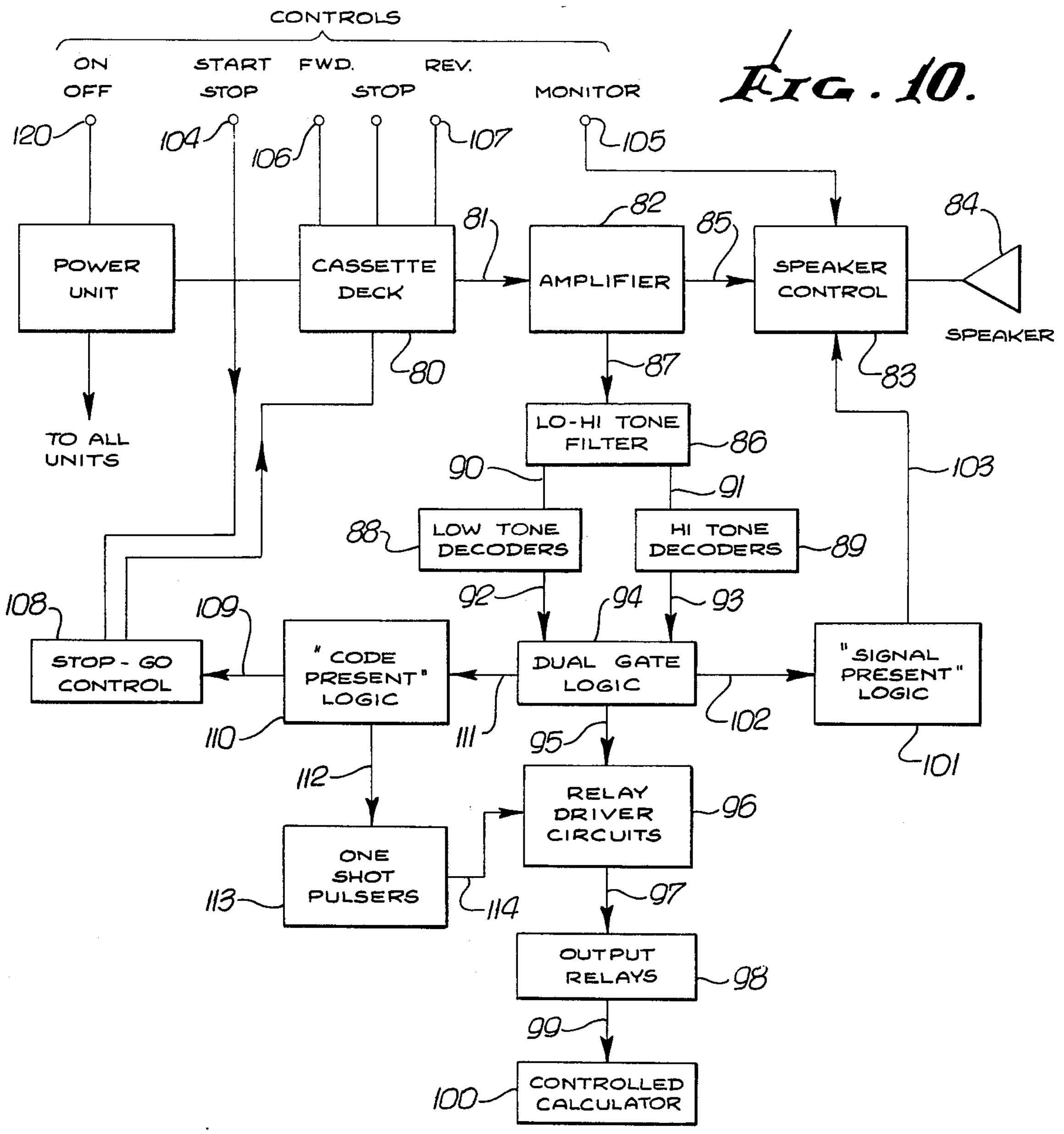

FIG. 9 is a block diagram of a tone generator circuitry usable in FIG. **6*a* system; and FIG. 10 is a block diagram of tone decoder circuitry usable in the FIG. 6*b*** system.

DETAILED DESCRIPTION

Figure 1:
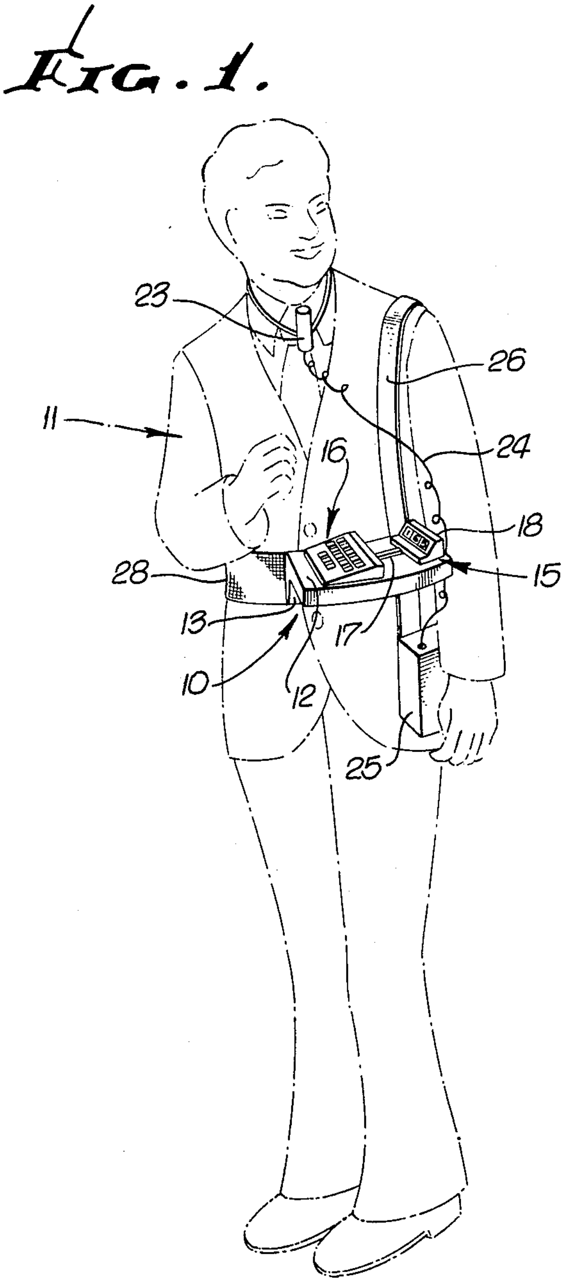
FIG. 1 is an elevation representing inventory taking employing the invention.
Figure 2:
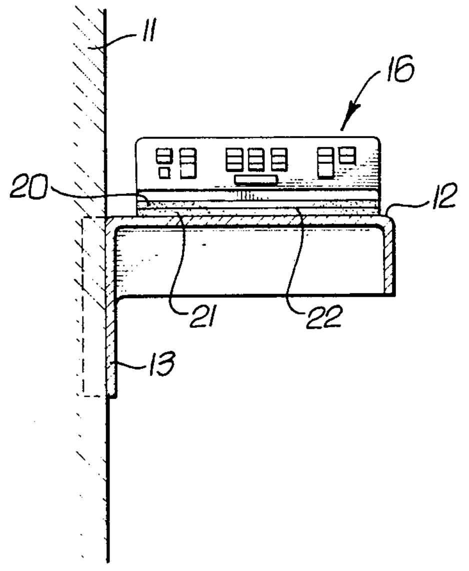
FIG. 2 is a vertical section through a platform shown in FIG. 1.

Referring first to FIGS. 1 and 2, a platform 10 is sized to be attached to or carried by an inventory taker 11 moving about a storage area for articles to be inventoried. The platform includes a generally horizontal table portion 12 and a generally upright wall 13 concavely shaped to engage the side of the inventory taker's body for firm support, thereby to orient the table portion. The platform may be constructed as a unit, and for example may comprise molded glass fibers.

Figure 3:
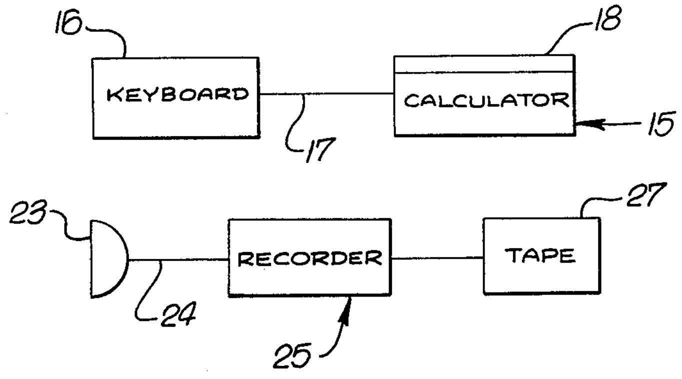
FIG. 3 is a block diagram of one form of system employing the invention.

In one form of the invention also illustrated in FIGS. 1 and 3, an electronic calculator 15 is supported by the table portion 12, as by attachment, and a separate keyboard module 16 is operatively connected with the calculator as at cable 17, the latter representing the usual electrical connections between the keyboard of a calculator and its calculator circuitry. The visual display output of the latter is represented at 18 in FIG. 1. The module is, however, separately supported on the platform, (as for example on table portion 12) to be removable therefrom, and independently of the calculator. As seen in FIG. 2, the interconnection of the module 16 to the table 12 is accomplished by means of VELCRO strips or layers 20 and 21 respectively attached to the module and table, and releasably interconnectible at their interface 22, as is known. Thus, the operator may adjust the position or orientation of the module 16 on the platform to best suit his comfort and hand and arm positions, to enhance accuracy. Also, the module including the keyboard, as separate from the calculator 15, may be enlarged or sized for ease of use, the keys then having the approximate size of standard typewriter keys.

Figure 4:
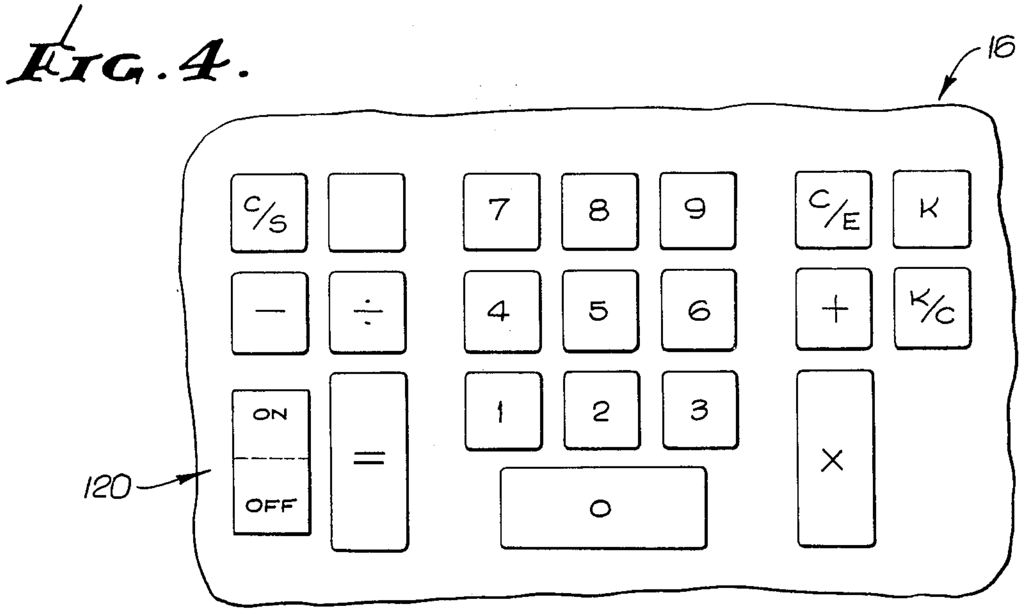
FIG. 4 is a keyboard module usable in the FIG. 3 system.

FIG. 4 shows one form of module 16, with keys for numerals 0–9, addition, subtraction, multiplication, division and equality, keys C/E (clear entry), C/S (change sign), C/A (clear all), K (constant) and K/C (constant clear). An ON/OFF switch is also provided. The calculator itself may comprise a Sony or Sharp electronic calculator, for example.

Figure 5:
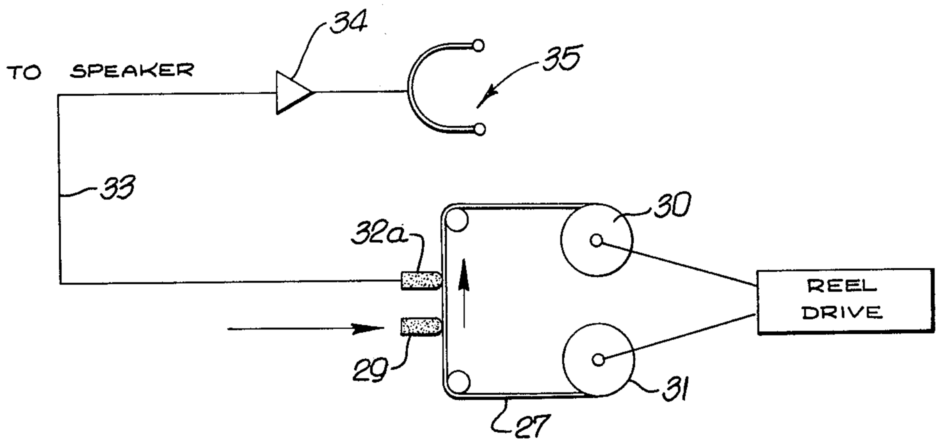
FIG. 5 is a showing of a cassette recorder as usable in FIG. 3.

The operator, noting the calculated result on the display 18 associated with the calculator, announces that result audibly into a microphone 23 the output 24 of which is transmitted to a tape recorder 25 which he may suspend as by strap 26 from his shoulder. The recorder may, for example, comprise a Sony Model TC-122 cassette deck, other recorders also being usable. The tape is indicated at 27, FIG. 5 showing an input or "write" head 29 engaging the tape being transported between reels 30 and 31. A "read after write" head **32*a* may be provided to provide an output 33, amplified at 34, and applied to a headset 35 worn by the operator as a validation check, assuring that the operator's voice has been recorded on the tape. Means to clamp the platform wall 13 to the inventory taker's body may comprise a strap 28, as shown in FIG. 1.**

FIGS. 6–10 show a modified form of the invention in which both voice and tone signals are recorded on tape carried by the inventory taker, for later processing of the tone signals by an electronic calculator. A keyboard module represented at 30 in FIG. **6*a* is mounted on the platform 12, as before, along with a signal generator 32 (as for example audible frequency or tone generator), the latter occupying the position of the calculator 15 in FIG. 1, and the keyboard being adjustable or movable, as before. The keyboard module and the generator 32** may be considered together as generating means for generating a sequence of differently modulated code signals corresponding to a sequence of values representative of articles to be inventoried, as for example the number of similar articles or the number of groups of similar articles, or the monetary values of individual or groups of similar articles.

FIG. 8 shows one form of tone generator 32 comprising an amplifier 33 with feed-back loops **34*a*, 34*b* et seq with switches 35*a*, 35*b* et seq therein to selectively connect the loops across the amplifier and thereby produce an oscillatory output at 36 the frequence of which depends on which switches are closed. Loop precision resistors appear at 37*a*, 37*b*, et seq. The switches 35*a*, 35*b* et seq. may be considered as operated by the numeral keys of the keyboard module 30, one example of which is seen in FIG. 7. The latter is closely similar to the module of FIG. 4, but in addition a TONE/VOICE switch 38 is added. Such a switch is represented in FIG. 6*a* by switch arm 38. When the switch is in "tone" position, the output 36 of the tone generator is fed to the recorder unit 25 the same as described above, with recording tape 27. Alternatively, when switch arm 38 is in "voice" position, the output 24 from microphone 23 is passed to the recorder unit, and the tape will accordingly record voice or tones in selective sequence. This enables verbal instruction orientation of the human operator who ultimately reads the calculation totals on an electronic calculator (as for example unit 39 in FIG. 6*b*) and transcribes them onto a report or record sheet 40.** (For example, that operator may be given a verbal description of the goods being inventoried, or their relative locations in the storage area).

Following recordation in tape 27, the latter may be transported to a calculation zone represented by FIG. **6*b*, where the tape is read on a tape deck 41. There are many examples of the latter, one being Sony Model TC - 122 Cassette Deck. Calculator 39 responds to the electrical signal output 42 of the deck or tape reader 41 to accumulate calculated value totals readable at display 39*a* for transcription purposes as referred to. In this regard, a loudspeaker 43 is provided to respond to the tape reader output 42, and specifically to voice instructions, to reproduce such instructions in audible form for orientation instruction of the human operator, as described. A logic unit 44 receives the output 42, and passes signals corresponding to voice instructions to the loudspeaker 43 via path 45, and signals corresponding to the tone generator output at 36 to the tone decoder 48 via path 47. The output of the latter is fed at 48** to the calculator.

Referring to the modified tone generation system seen in FIG. 9, the output of the dual circuit keyboard 50 (which comprises an arrangement of key switches) is passed via dual paths 51 and 52 to precision resistor networks 53 and 54. Outputs 55 and 56 from the latter pass to precision integrated timing circuits 57 and 58. Such circuits produce at 59 and 60 two square wave signals (represented at **60*a* and 61) at different tone frequencies, determined by the operation of the keyboard, the use of dual frequences being later explained. Wave shaping networks convert these signals at 62 and 63 to approximate sine wave signals at 64 and 65, for combination and attenuation by network 66 into a signal at 67 approximating microphone output level. That signal is then fed to the switch 38 as previously described. Energization of the generator unit may be accomplished via a battery 70 carried on the platform 112, and via switches 71 and 72 seen in FIG. 9, switches 38 and 72** being ganged so that the tone generator unit is de-energized when the inventory taker is speaking into the microphone.

Reference is next made to FIG. 10 wherein a decode assembly of the type described in FIG. **6*b* is shown. The output 81 of tape deck 80 is amplified at 82 and directed both to the control circuit 83 for speaker 84, via path 85, and to the tone filter 86 via path 87. The loudspeaker is normally disabled by the circuitry 83,** except under certain conditions, as will appear.

The tone filter 86 separates the amplified input 87 into low and high tone frequency bands to minimize interference effects in decoder circuits 88 and 89 to which the filter outputs 90 and 91 are fed. Suitable band pass filters may be employed in filter network 86, for this purpose; specifically, network 86 may consist of a passive, two-section low pass and two-section high pass LC filter. An example of the decoder circuits is the Signetics IC Module Type NE 567 with low drift precision tuning components. The low group of usable frequencies may be 600 Hz, 697 Hz, 770 Hz, 852 Hz, and 941 Hz. The high group of frequencies may consist of 1085 Hz, 1209 Hz, 1336 Hz, 1477 Hz, 1633 Hz and 1785 Hz. These frequencies, in part, correspond to those used for telephony tone dialing and for some types of data and dataphone apparatus. The lowest tone of each group is a "rest" frequency, and codes are provided for shifting the frequencies to various combinations of other frequencies, each combination representing a numeral. The decoded frequencies, appearing at 92 and 93 are recognized by dual input gate circuits 94 whose outputs 95 activate relay driver circuits 96, the outputs 97 of the latter activating output relays 98 controlling keying circuitry of calculator 100 via path 100.

Additional logic functions may also be provided to be interrelated to the decoding function. Thus, to determine when a voice announcement is on the tape, a "signal present" logic gate 101 is used and connected as shown at 102 and 103. If any of the low frequency tones (or high frequency tones or both) is present as detected via path 102, the loudspeaker circuit 83 is turned "off" via path 103. If the tones are interrupted, as where the operator switches to "microphone", the absence of signal stops the tape, turns on the loudspeaker and indicates as by a suitable lamp. An audible alarm could be provided, if desirable. A manual "stop" 104 and manual "monitor" 105 controls are provided for stopping the function or controlling the tape for listening to the tape voice content. There are also the usual forward and reverse controls 106 and 107 associated with the tape transport system.

Lock-up logic 108 is provided as a "start" control for starting the tape initially or following a stop. This permits the tape to start and run and turns the speaker on, for periods on the tape when there are no tones. This lock-up is released via path 109 when the signal present logic 101 determines that a tone signal is present. When the lock-up releases, the loudspeaker is turned off and the tape continues to run in decoding mode, until another stop occurs or until the end of tape. When the tape ends, a no-tone condition occurs, and the stop situation, with visual or audible cues, occurs.

A "code present" logic 101 is provided to determine when a code (decoded two-tone code) is present or absent. It provides two functions, both intended to improve reliability of the decoding process and reduce exposure to errors which might occur due to faulty tone registration on the tape. This logic holds all relay driver circuits and/or output relays inoperative until a decoded signal is present, as detected via path 111. The logic then triggers, via path 112, a "one-shot" pulsing circuit 113, which controls driver 96 via path 114 to permit the output signal to be fed to the controlled calculator for a short measured time interval. The optimum interval is typically on the order of 10 to 20 milliseconds, and may be dictacted by the requirements of the calculator in use. Following the output pulse, the one-shot circuit is disabled, and cannot reoperate until recorded tone frequencies return to rest frequency. This reduces the possibility of error that might occur if the operator should roll his fingers in such a way that the tone frequencies would change during a decoding. All keys are typically released during the break between keyed digits, requiring "clean" keying. When the rest frequency is dectected, the one-shot is reset, and the next decoding can take place.

A master ON/OFF control appears at 120.

I claim:

1. For use in a system for taking an inventory wherein values are recorded, the values being representative of articles, and wherein generator means is operable to generate a sequence of differently modulated signals corresponding to a sequence of said values, recording means is responsive to the generating means to record on a recording medium that sequence of signals for subsequent readout, and voice instruction input means is connected with the recording means for intermittently recording, on said recording medium, voice instructions concerning said articles, the improvement comprising a. readout means for reading the recording medium, and having a signal sequence output and a voice instruction output, b. a calculator operatively connected with the readout means to be responsive to the signal sequence output for accumulating calculated value totals for display and transcription purposes, c. and a loudspeaker operatively connected with the readout means to be responsive to the voice instruction output to reproduce the voice instructions in audible form, d. there being speaker control circuitry and means operatively connected therewith and with the readout means to enable the speaker in response to the absence of said signal sequence output, and also to control start-stop operation of the readout means while the speaker is so enabled.

2. The combination of claim 1 including said generator means, recording means and voice instruction input means as defined in claim 1, and also comprising a. a platform having a table portion and a generally upright wall shaped to clamp against the inventory taker's body, b. the generator means having a keyboard operable to produce signals to operate an electronic calculator, and c. means removably connecting the module to the platform table portion.

3. The combination of claim 2 wherein said generating means is responsive to the signal output of the keyboard to generate a sequence of differently modulated code signals subject to later decoding to operate the calculator.

* * * * *